Patented Sept. 29, 1942

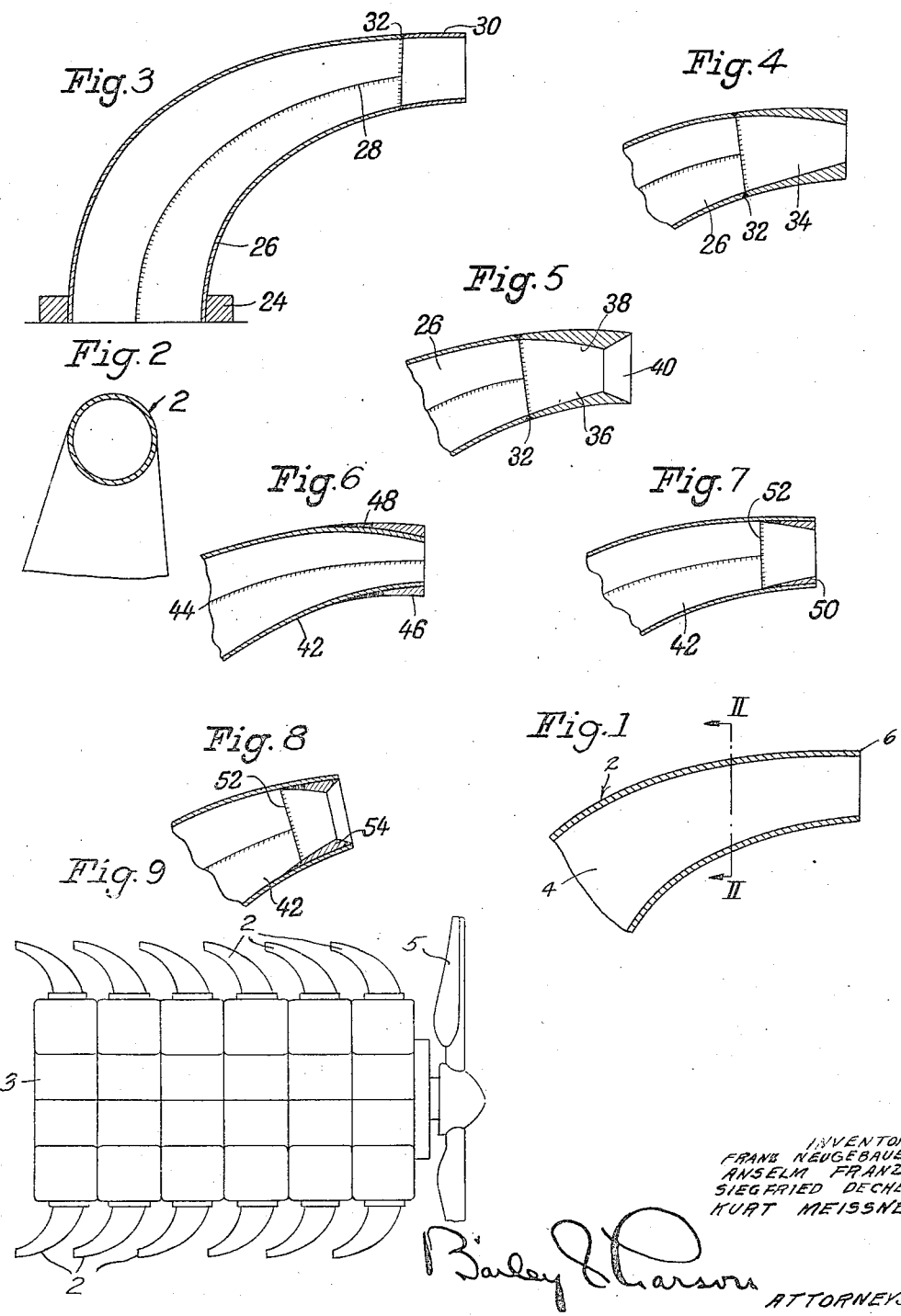

2,297,239

UNITED STATES PATENT OFFICE 2,297,239

DISCHARGE NOZZLE

Franz Neugebauer, Allach, near Munich, Anselm Franz, Dessau-Ziebigk, and Siegfried Decher and Kurt Meissner, Dessau, Germany; vested in the Alien Property Custodian Application February 23, 1939, Serial No. 258,082 In Germany February 25, 1938

9 Claims. (Cl. 60—35.6)

This invention is directed to the construction of a discharge nozzle for an exhaust manifold wherein the reaction pressure of the discharged exhaust gases is used to aid in the propulsion of an aircraft.

It is well known that gases emitted from a pipe produce a recoil action on the pipe, which recoil action may be used as a propulsion force. The degree of reaction force obtained through the discharge of the exhaust gases depends upon the shape and construction of the discharge nozzle of the exhaust pipe. Because of the heat developed by the burning exhaust gases emitted from an internal combustion engine, considerable difficulty is encountered in the proper construction of discharge nozzles of lightweight sheet metal, as the discharge orifice thereof is subject to distortion by warping under the heat and pressure of the exhaust gases, and the disintegration of the materials forming the nozzle under the corrosive action of the discharged gases. In aircraft construction particularly, the discharge nozzles are made of relatively thin sheet metal in order to keep the weight of the construction as low as possible. This is particularly true if the nozzles are given forms most efficient for obtaining the desired recoil action, especially if the nozzles are given a flattened cross section. Improper construction of the exhaust nozzles will not only cause the nozzles to lose their efficiency because of change in shape due to heat and pressure, but the nozzles may burst and injure the aircraft and the passengers contained therein.

It is an object of the invention to construct a thin sheet metal gas exhaust nozzle which will give an efficient recoil action from the discharge of gases therethrough and thus aid in the propulsion of an aircraft.

Another object of the invention is to construct a gas exhaust nozzle which will retain its shape under operating conditions to insure a uniform and constant recoil action for the propulsion of aircraft.

Another object of the invention is to construct a thin sheet metal gas exhaust discharge nozzle which is properly reinforced in order to resist distortion under the action of hot exhaust gases.

Another object of the invention is to construct a lightweight thin sheet metal nozzle having at least the end forming the discharge orifice thereof made of seamless construction in order to prevent distortion and bursting of the nozzle under the action of hot discharge gases.

Generally these objects of the invention are obtained by constructing at least the discharge orifice end of a nozzle without seams or joints, or, if seams or joints are used, by properly reinforcing the orifice end of the nozzle so that it will retain its shape under the heat and pressure of hot exhaust gases. The nozzles are attached to the ends of the exhaust manifolds coming from the cylinders of an internal combustion engine, the nozzles being directed toward the rear, or at an acute angle toward the rear, of an aircraft flying forwardly, so that the gases emerging from the nozzles give a reaction force which aids in propelling the aircraft forward.

A means by which the objects of this invention are obtained is shown in the accompanying drawing, in which:

Fig. 1 is a cross sectional view of a seamless discharge nozzle.

Fig. 2 is a cross sectional view on the line 2—2 of Fig. 1.

Figs. 3 to 8, inclusive, are cross sectional views, respectively, of different forms of nozzles having their discharge ends reinforced to prevent the distortion of the discharge orifice by the exhaust gases.

Fig. 9 is a plan view of a cylinder in line aircraft engine showing the nozzles applied thereto.

Similar reference characters refer to similar parts in the various figures of the drawing.

In Figs. 1 and 2, the nozzle 2 is of circular section and tapers from the wide end 4 which is adapted to be secured to the exhaust manifold of an internal combustion engine, toward the constricted discharge end 6. The nozzle is constructed as an integral, seamless, hollow member of light sheet metal. Nozzle 2 can be produced by any conventional means, such as by swaging.

The tapered, seamless nozzle of Fig. 1 can be connected to a seamless tube which comprises the exhaust manifold of the engine. Therefore, a seamless tubular construction of sheet metal is obtained which has a constricted discharge orifice and comprises the entire exhaust system from the exhaust ports of an internal combustion engine to the discharge orifice, the seamless construction giving the advantages of lightweight sheet metal construction, while the tapered nozzle is reinforced to eliminate the weakness of welded joints, or other joints which would cause the thin sheet metal to break or buckle under the heat and pressure of the hot exhaust gases.

Figs. 3 to 8 illustrate the reinforcing of the discharge end of the tapered nozzle, when the nozzle includes a welded seam. The nozzles are, as in Figs. 1 and 2, circular in section.

In Fig. 3, the exhaust manifold 24 has connected thereto a nozzle 26 of tapered longitudinal section and made from a flat sheet bent with its sides forming the welded seam 28, and to the end of which nozzle 26 a seamless, tapered annular member 30 forming the reinforced constricted orifice end is connected as by means of a weld 32. Both the nozzle 26 and the discharge end 30 are made of thin sheet metal, the seamless construction of end 30 providing a greater resistance to the action of the exhaust gases than the use of a built up construction would give. This construction thus has a marked advantage over a construction in which, for example, the welded joint 28 would extend to the very end of the nozzle.

Figs. 4 to 8 illustrate reinforcing means for the discharge orifice in which the added reinforcing member is thicker than the nozzle and is shaped to produce the constricted orifice.

Fig. 4 discloses a construction similar to Fig. 3, except that the discharge end of the nozzle is constructed of a cylindrical, seamless tube 34 welded to the nozzle 26. The end member 34 is either cast or machined to give an interior surface of proper tapered form which will produce the proper recoil force under the action of the exhaust gases.

In Fig. 5, the end member 36 is similar to the member 34 in Fig. 4, except that the interior surface is first constricted at 38 from the surface of the nozzle 26, and then enlarged at 40 to form a Venturi orifice through which the exhaust gases are discharged into the atmosphere.

Fig. 6 discloses a nozzle 42 in which the welded seam 44 extends to the discharge orifice end of the nozzle. In order to reinforce this end properly, a collar 46 is placed over the discharge end of the nozzle 42 and welded thereto, as by a fillet weld 48 on the outside of the nozzle 42.

Fig. 7 illustrates a construction similar to Fig. 6, except that collar 50 is inserted inside of the nozzle 42 by weld 52. The collar 50 is given a conical inner surface in order that the discharge end of the nozzle forms a constricted orifice.

Fig. 8 is similar to Fig. 7, except that the inner reinforcing collar 54 is shaped to provide a Venturi orifice.

The nozzles of Figs. 1 to 8, inclusive, are used with conventional aircraft engines and supplement the propeller propulsion of such engine. This is illustrated in Fig. 9 where the nozzles 2, for example, form the reaction producing exhaust stacks for the engine 3 which drives the propeller 5.

In all the various forms of the invention described, the discharge end of the nozzle is tapered to form a constricted discharge orifice, and the shape of this orifice is maintained against deformation by the heat and pressure of exhaust gases. The nozzles are at least in part constructed of light weight sheet metal and can take and hold a shape for an orifice which maintains a uniform recoil action from the exhaust gases, while, at the same time, the nozzle can be shaped to offer the least air resistance.

Having now described a means by which the objects of this invention are obtained, what is claimed is:

1. A recoil action producing exhaust nozzle for each individual cylinder of a multicylinder internal combustion engine comprising a tubular thin sheet metal member curved along its longitudinal axis having a longitudinal seam, said member having a constricted outlet end portion, and means for reinforcing said constricted outlet end portion comprising a seamless heat and pressure resistant annulus rigidly secured to said constricted outlet end portion.

2. A recoil action producing exhaust nozzle as defined in claim 1, said annulus having an inwardly constricted portion intermediate its length and forming a Venturi orifice for said exhaust nozzle.

3. A recoil action producing exhaust nozzle as defined in claim 1, said heat and pressure resistant seamless annulus having its inner end rigidly secured to the outer end of said tubular thin sheet metal member and forming a prolongation thereof.

4. A recoil action producing exhaust nozzle for an internal combustion engine comprising a tubular thin sheet metal member curved along its longitudinal axis having a constricted outer discharge end portion, and means for reinforcing said discharge end portion against heat and pressure comprising a thickened reinforcing heat and pressure resistant metal element of tapered cross section secured to a portion, at least, of said discharge end portion.

5. A recoil producing exhaust nozzle as defined in claim 4, said reinforcing heat and pressure resistant element forming a Venturi orifice for said nozzle.

6. A recoil producing exhaust nozzle as defined in claim 4, said reinforcing heat and pressure resistant element having its outer surface rigidly secured to the inner surface of the discharge end portion of said thin sheet metal member.

7. A recoil nozzle as in claim 1, said annulus enclosing and being welded to the outer peripheral surface of said end portion.

8. In an exhaust system for a multi-cylinder aircraft engine, a separate sheet metal exhaust conduit for each cylinder of said engine, each conduit being longitudinally curved and of relatively short length and having its discharge end narrowed to form a reaction nozzle, an annulus of wedg-shaped section overlapping said discharge end for reinforcing the same, and a weld of wedge-shaped section securing said annulus to said conduit and providing a fillet for preserving the stream-lined shape of said conduit.

9. A reaction gas exhaust nozzle adapted to serve as the exhaust conduit for a cylinder of a multicylinder internal combustion aircraft engine comprising a thin sheet metal tube longitudinally curved from a relatively large inlet section adapted to be secured to the exhaust port of said engine to a relatively narrow gas discharge section the plane of which is substantially normal to the plane of said wide section, and the discharge end of said nozzle, including at least said relatively narrow section, being of a reinforcing seamless construction.

FRANZ NEUGEBAUER.
ANSELM FRANZ.
SIEGFRIED DECHER.
KURT MEISSNER.